US008494169B2

(12) United States Patent
Schneider

(10) Patent No.: US 8,494,169 B2
(45) Date of Patent: Jul. 23, 2013

(54) VALIDATING ENCRYPTED ARCHIVE KEYS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 672 days.

(21) Appl. No.: 12/201,432

(22) Filed: Aug. 29, 2008

(65) Prior Publication Data

US 2010/0054475 A1 Mar. 4, 2010

(51) Int. Cl.
*H04L 9/00* (2006.01)

(52) U.S. Cl.
USPC ............ 380/277; 380/44; 380/286; 713/168; 713/181

(58) Field of Classification Search
USPC .................... 380/277, 44, 286; 713/168, 181
See application file for complete search history.

(56) References Cited

U.S. PATENT DOCUMENTS

| | | | | |
|---|---|---|---|---|
| 6,549,626 | B1 | 4/2003 | Al-Salqan | |
| 6,732,270 | B1 * | 5/2004 | Patzer et al. | 713/170 |
| 7,010,689 | B1 * | 3/2006 | Matyas et al. | 713/168 |
| 7,392,384 | B2 | 6/2008 | Hopkins et al. | |
| 8,144,876 | B2 | 3/2012 | Schneider | |
| 2005/0114672 | A1 * | 5/2005 | Duncan et al. | 713/182 |
| 2007/0005955 | A1 * | 1/2007 | Pyle et al. | 713/156 |
| 2010/0031051 | A1 * | 2/2010 | Machani et al. | 713/181 |
| 2010/0054476 | A1 | 3/2010 | Schneider | |

OTHER PUBLICATIONS

Office Action for U.S. Appl. No. 12/201,502 mailed Mar. 14, 2011.
Notice of Allowance for U.S. Appl. No. 12/201,502, mailed Nov. 16, 2011.

* cited by examiner

*Primary Examiner* — Edward Zee
*Assistant Examiner* — Baotran N To
(74) *Attorney, Agent, or Firm* — Lowenstein Sandler LLP

(57) ABSTRACT

An apparatus and a method for validating encrypted archive keys is described. In one embodiment, a passphrase is enciphered. An archive key used to encipher an archive is enciphered with the enciphered passphrase. A first enciphered block is computed by enciphering a random block with the archive key. A second enciphered block is computed by enciphering the same random block with a Message Authentication Code (MAC) key. The MAC key is derived from the archive key and the passphrase. The validity of keys is determined by comparing the decrypted first block with the decrypted second block.

14 Claims, 6 Drawing Sheets

VALIDATING ENCRYPTED ARCHIVE KEYS

TECHNICAL FIELD

Embodiments of the present invention relate to computing systems, and more particularly, to secure archive storage.

BACKGROUND

Archives are file systems and documents that are stored in persistent storage systems. Persistent storage systems include fixed optical or magnetic drives, flash memory devices, and removable storage devices such as read-write compact discs (RW-CDs) drives and magnetic tape drives. These archives are enciphered to secure the contents of the drive by limiting access to the contents of the archive to a user supplying a correct password.

The enciphering process that creates or adds to an archive requests a password from a user. The password is then input into a hashing algorithm to produce a key. The key is utilized to encipher the entire archive using a block cipher algorithm. However, this system presents several security and logistical problems. If the same password is used for multiple archives, then the same key is generated for each archive. Determining a key that is utilized to encipher data is made easier when a larger set of enciphered data is available. Thus, using the same key for multiple archives is not desirable, because it creates a large data set that is more vulnerable to unauthorized access.

Another problem with the use of this method and system is that the change of a password requires that the entire archive be re-enciphered using a new key generated from the new password. Archives can be large and re-enciphering these archives can be time consuming and inconvenient. All archives enciphered with a changed key must be deciphered and then re-enciphered with a new key. Also, archives can be distributed over multiple volumes, which can be on separate devices or discs. As a result, the changing of the password can be very time and resource consuming especially for large archives or archives with multiple volumes.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for validating encrypted archive keys is described. In one embodiment, an archive key used to encipher an archive is enciphered with the enciphered passphrase. A first enciphered block is computed by enciphering a random block with the archive key. A second enciphered block is computed by enciphering the same random block with a Message Authentication Code (MAC) key. The MAC key is derived from the archive key and the passphrase. The validity of keys is determined by comparing the decrypted first block with the decrypted second block.

Figure 1:
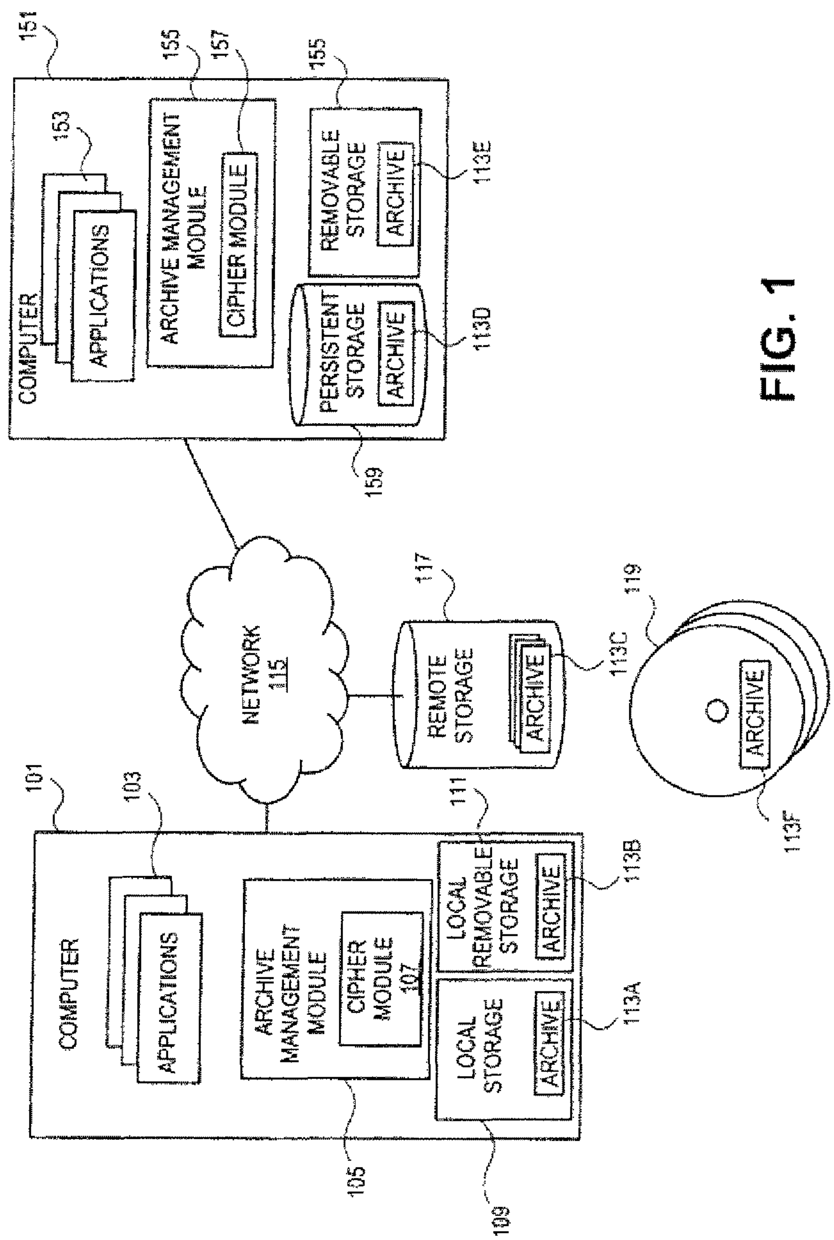
FIG. 1 is a block diagram illustrating one embodiment of a system for archive storage.

FIG. 1 is a block diagram illustrating one embodiment of a system for archive storage. The system for archive management includes at least one computer 101 having an archive management module 105 and at least one local storage device 109, 111. The system may also include additional computers 151, remote storage units 117, and network connections 115.

Computer 101 can be any type of computing device including a desktop computer, laptop computer, server, handheld device, console device, wireless device or similar computing device. The computer can execute any number of applications 103. These applications can be any type of applications including word processing applications, web browsing applications and similar applications. The applications 103 can generate date to be stored in local or remote storage devices.

Computer 101 can also include any number of local storage devices. Local storage devices may be fixed 109 or removable storage devices 111. Local fixed storage devices 109 can include a hard drive (magnetic storage device), flash memory device, optical storage device or similar fixed storage device. Removable storage devices 111 can include a read/write compact disc players, digital versatile disc (DVD) players, high definition (HD) disc players such as a BLU-RAY or HD DVD read/write drives and magnetic storage drive such as a tape or ZIP disk storage drives or similar storage devices that store data in associated media 119.

Computer 101 includes an archive management module 105. The archive management module 105 is a program or component of the computer 101 that enables applications 103, operating system components and similar programs on the computer 101 to access and store data in archives in the local storage devices 109, 111. The applications 103 or other programs can directly call the archive management module 105 or a user can interact with the archive management module to archive data files stored in the storage devices 109, 111.

In one embodiment, the archive management module 105 includes a cipher module 107. The cipher module 107 enciphers data to be stored in an archive or deciphers data stored in an archive. An archive may be enciphered to protect the data within that archive from malicious manipulation or for other security purposes by controlling access through use of the password. The cipher module 107 can also manage and maintain password protection for the archives. Password management can include clearing a user for a password when accessing a persistent storage device and providing an interface for a user to change a password for an archive.

Other components can be linked to the computer system 101 over a network 115. The network 115 can be any type of network including a local area network (LAN), a wide area network (WAN), such as the Internet or similar networks. The network can have wired or wireless components. Any number of devices may be in communication with one another over the network 115. In one embodiment, the archive management module 105 enables the computer 101 and applications 103 on the computer 101 to interface with archives on other devices such as a remote storage unit 117 or another computer 151. The archive management module 105 can access these other storage archives directly or through intermediate programs or protocols. For example, the archive management module 105 can interface with another archive management module 155 to access archives local to that archive management module 155.

A remote storage device 117 can be a network server or storage device such as an external hard drive connected over a USB network or a remote backup device or similar storage device. The remote storage device 117 can store any number of archives 113C and provide access to these archives to any number of archive management modules 105, 155.

Computer 151 can be any type of computer including a desktop computer, server, laptop computer, handheld device, wireless device, console device or similar computing device. The computer 151 can include each of the elements described above in regard to computer 101. These components can include applications 153, archive management module 155, cipher module 157, fixed storage devices 159, removable storage device 155 and similar components.

Any number of archives 113A-F can be stored on any of the available storage devices. Any number of separate archives can be stored on any single device. Likewise, individual archives can be distributed across any number of these devices. The archives can have any format or size.

Figure 2:
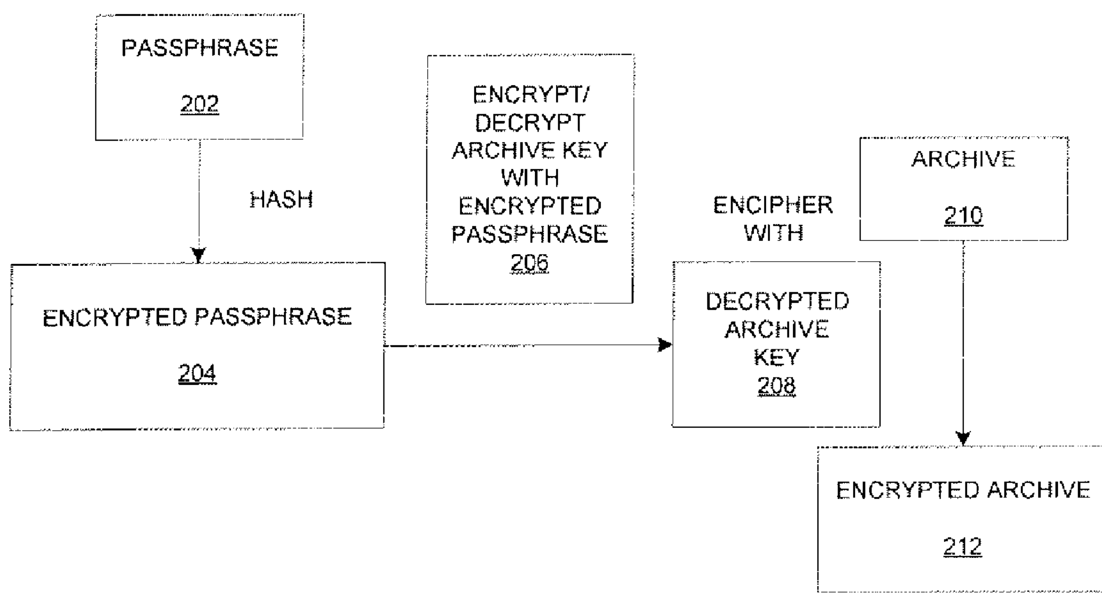
FIG. 2 is a block diagram illustrating one embodiment of enciphering an archive.

FIG. 2 is a block diagram illustrating one embodiment of enciphering an archives A passphrase 202 is enciphered using for example, a simple iterated hash. The enciphered passphrase 204 is used as the key to encipher the key or keys 208 used to encipher the archive 210 into an encrypted archive 212. The archive key is encrypted with the encrypted passphrase as a key at 206. As such, no part of the key is derived directly from the passphrase.

Figure 3:
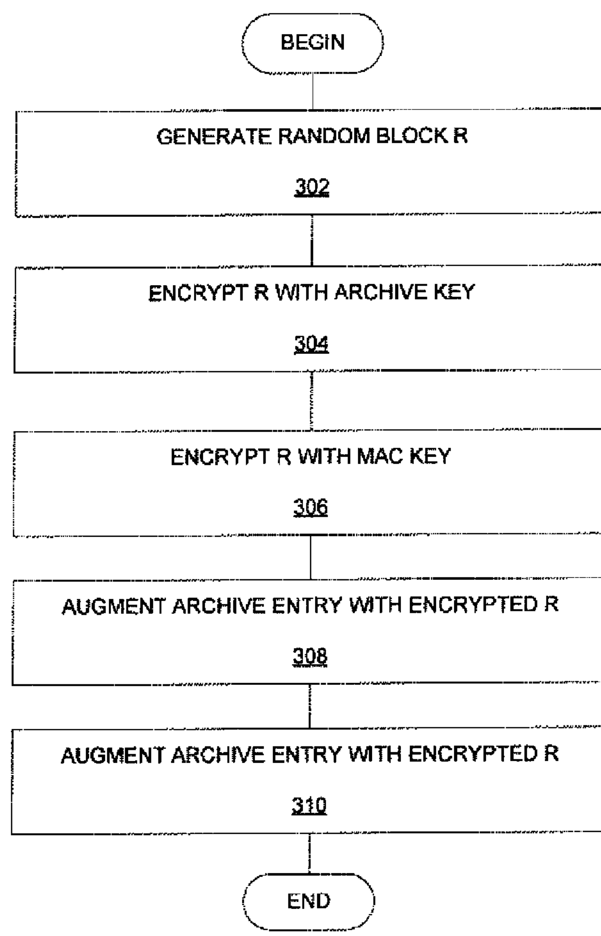
FIG. 3 is a flow diagram illustrating one embodiment of a method for enciphering an archive.

FIG. 3 is a flow diagram illustrating one embodiment of a method for enciphering an archive. One simple embodiment would be an MD5 hash of the passphrase, and XOR the result of that with the key used to encipher the archive—if P was the passphrase, K, the key used to encipher the archive, H( ) the hash function, D the (unenciphered) data to be added to the archive, and E( ) the encryption function used to encipher the archive, an encrypted archive (or archive entry, in the case where each entry has its own key) would be presented as the concatenation of H(P) XOR K and E(D,K). The security of this scheme rests on the difficulty of breaking E and H.

Decrypting the archive would require extracting the H(P) XOR K value, computing the hash H(P), and performing an XOR between the two (H(P) XOR K XOR H(P)==K). Changing the password would require recovering K, XORring it with H(P') (where P' is the new password) and storing H(P') XOR K in place of the older value. A variation would be to have an archive key A, and use a MAC M( ) to process the passphrase, and use the encipherment algorithm F( ) (which may or may not be E( )) to encipher the key K. The archive entry would then be A, F(K, M(P, A)), E(D, K).

At 302, a random block R is generated. The random block R is encrypted with the archive key K at 304. The random block R is also encrypted with the a MAC key at 306. At 308, the archive entry is augmented with the archive key K encrypted random block R. At 310, the archive entry is augmented with MAC key encrypted random block R.

Figure 4:
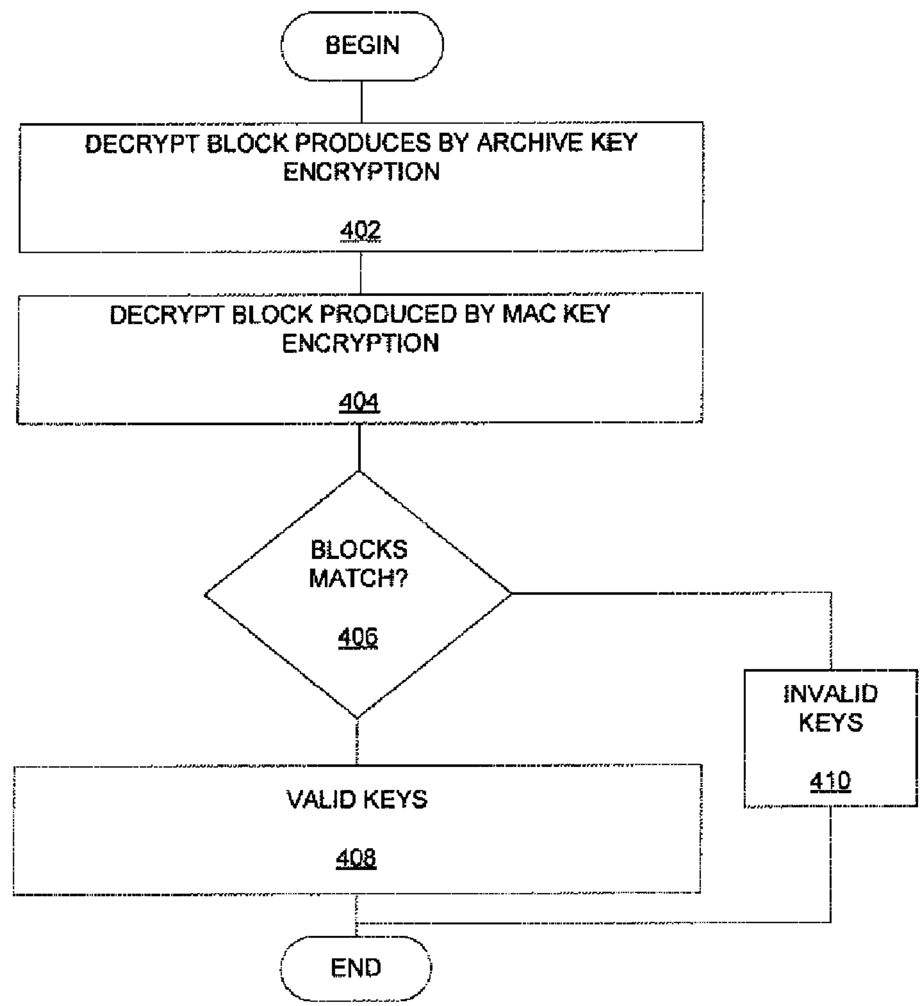
FIG. 4 is a block diagram illustrating one embodiment of a method for validating encrypted archive keys.

FIG. 4 is a block diagram illustrating one embodiment of a method for validating encrypted archive keys. At 402, a block produced by an archive key encryption is deciphered with a first key. At 404, a block produced by a MAC key encryption is deciphered with a second key. At 406, the results of both blocks is compared to determine the validity of the first and second keys. If the deciphered blocks match, the keys are determined to be valid at 408. If the deciphered blocks do not match, the keys are determined to be invalid at 410.

One feature of the present invention is to quickly validate that the password is valid without including a standard header in the archive data before encipherment (which would increase the threat of a known plaintext attack—the standard header would most definitely be known plaintext). The archive entry is augmented with two blocks, both derived from the same random block R—one is R encrypted with the key K, the other is R encrypted with the key M(K, P), using algorithms G( ) and J( ) (which may be identical to each other, or E( ), or F( ), or any combination). The archive entry now becomes A, F(K, M(P, A)), G(R, K), J(R, M(K, P)), E(D, K)—the correct key can be validated by decrypting the blocks produced by G and J, and determining that they match. Changing the passphrase only requires replacing the F(K, M(P, A)) and J(R, M(K, P)) values.

Figure 5:
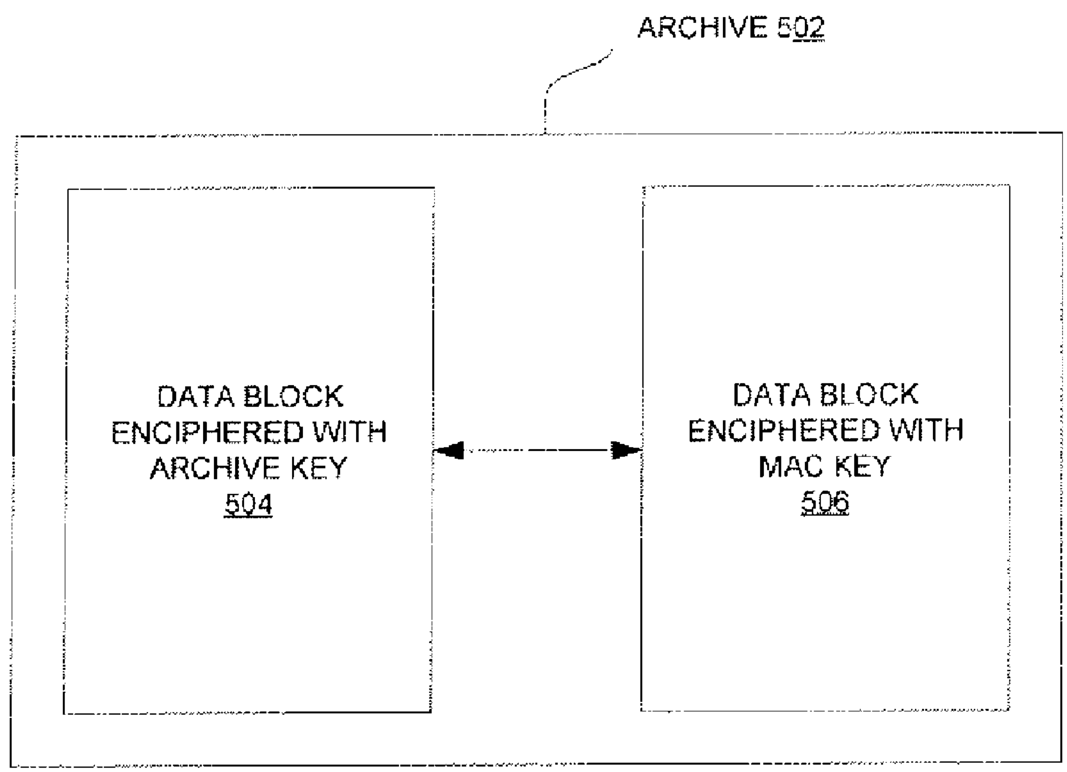
FIG. 5 is a block diagram of one embodiment of an encrypted archive.

FIG. 5 is a block diagram of one embodiment of an encrypted archive 502 with data block enciphered using two methods. A first data block 504 in archive 502 is enciphered using an archive key. A second data block 504 in archive 502 is enciphered using a MAC computed key.

Figure 6:
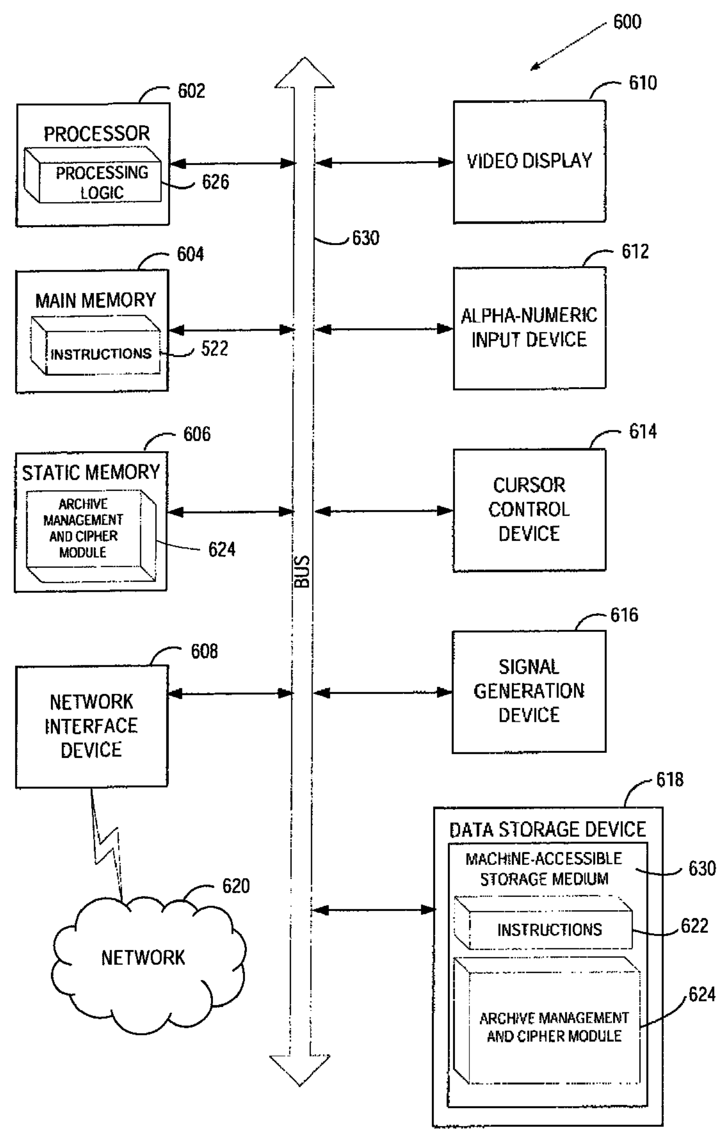
FIG. 6 is a block diagram illustrating an example of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-lop box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store an archive management and cipher module 624 as presently described. The archive management and cipher module 624 may also be stored in other sections of computer system 600, such as static memory 606.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:

enciphering a passphrase to generate an enciphered passphrase;

enciphering an archive key with the enciphered passphrase to generate an enciphered archive key;

enciphering, by a processing device, an archive stored in a storage device using the archive key to generate an enciphered archive;

storing the enciphered archive key with the enciphered archive;

computing a first enciphered block by enciphering a first copy of a random block using the archive key;

computing a second enciphered block by enciphering a second copy of the random block with a Message Authentication Code (MAC) key derived from the archive key and the passphrase; and augmenting the enciphered archive with the first enciphered block and the second enciphered block, wherein the first enciphered block and the second enciphered block are not part of a header associated with the enciphered archive.

2. The method of claim 1 further comprising:

determining the archive key;

generating the MAC key using the archive key and a user presented passphrase;

decrypting the first enciphered block using the archive key;

decrypting the second enciphered block using the generated MAC key;

comparing the decrypted first block to the decrypted second block; and if the decrypted first block matches the decrypted second block, determining that the user presented passphrase matches the passphrase and is valid.

3. The method of claim 1 wherein the enciphered archive is the concatenation of H(P) XOR K and E(D,K) where H is a hash function, P is the passphrase, K is the key used to encipher the archive, E is an encryption function, D is an unenciphered data to be added to the archive.

4. The method of claim 1 wherein the enciphered archive is A, F(K,M(P,A)), E(D,K) where A is an archive key, F is an encryption algorithm, K is the key used to encipher the archive, M is a MAC function, P is the passphrase, E is an encryption function, D is an unenciphered data to be added to the archive.

5. The method of claim 1 wherein the enciphered archive is A, F(K, M(P,A)), G(R,K), J(R,M(K,P)), E(D,K), where A is an archive key, F is an encryption algorithm, M is a MAC function, P is the passphrase, G is an encryption algorithm, R is a random block, K is the key used to encipher the archive, J is an encryption function, E is an encryption function, and D is an unenciphered data to be added to the archive.

6. A system comprising:

a storage device to store an archive;

a memory; and a processing device coupled to the memory;

an archive management module executed from the memory by the processing device to manage the storage of data in the archive on the storage device; and a cipher module coupled to the archive management module and executed from the memory by the processing device to encipher a passphrase to generate an enciphered passphrase, and an archive key with the enciphered passphrase to generate an enciphered archive key, to encipher an archive on the storage device using the archive key to generate an enciphered archive, to store the enciphered archive key with the enciphered archive, to compute a first enciphered block by enciphering a first copy of a random block with the archive key, to compute a second enciphered block by enciphering a second copy of the random bock with a Message Authentication Code (MAC) key derived from the archive key and the passphrase, and to augment the enciphered archive with the first enciphered block and the second enciphered block, wherein the first enciphered block and the second enciphered block are not part of a header associated with the enciphered archive.

7. The system of claim 6 wherein the cipher module is further to:

determine the archive key;

generate the MAC key using the archive key and a user presented passphrase;

decrypt the first enciphered block using the archive key;

decrypt the second enciphered block using the generated MAC key;

compare the decrypted first block to the decrypted second block; and if the decrypted first block matches the decrypted second block, determine that the user presented passphrase matches the passphrase and is valid.

8. The system of claim 6 wherein the enciphered archive is the concatenation of H(P) XOR K and E(D,K) where H is a hash function, P is the passphrase, K is the key used to encipher the archive, E is an encryption function, D is an unenciphered data to be added to the archive.

9. The system of claim 6 wherein the enciphered archive is A, F(K,M(P,A)), E(D,K) where A is an archive key, F is an encryption algorithm, K is the key used to encipher the archive, M is a MAC function, P is the passphrase, E is an encryption function, D is an unenciphered data to be added to the archive.

10. The system of claim 6 wherein the enciphered archive is A, F(K, M(P,A)), G(R,K), J(R,M(K,P)), E(D,K), where A is an archive key, F is an encryption algorithm, M is a MAC function, P is the passphrase, G is an encryption algorithm, R is a random block, K is the key used to encipher the archive, J is an encryption function, E is an encryption function, and D is an unenciphered data to be added to the archive.

11. A non-transitory computer readable storage medium including instructions that, when executed by a computer system, cause the computer system to perform a set of operations comprising:

enciphering a passphrase to generate an enciphered passphrase;

enciphering an archive key with the enciphered passphrase to generate an enciphered archive key;

enciphering, by the computer system, an archive stored in a storage device using the archive key to generate an enciphered archive;

storing the enciphered archive key with the enciphered archive;

computing a first enciphered block by enciphering a first copy of a random block using the archive key;

computing a second enciphered block by enciphering a second copy the random block with a Message Authentication Code (MAC) key derived from the archive key and the passphrase; and augmenting the enciphered archive with the first enciphered block and the second enciphered block, wherein the first enciphered block and the second enciphered block are not part of a header associated with the enciphered archive.

12. The non-transitory computer readable storage medium of claim 11 further comprising:

determining the archive key;

generating the MAC key using the archive key and a user presented passphrase;

decrypting the first enciphered block using the archive key;

decrypting the second enciphered block using the generated MAC key;

comparing the decrypted first block to the decrypted second block; and if the decrypted first block matches the decrypted second block, determining that the user presented passphrase matches the passphrase and is valid.

13. The non-transitory computer readable storage medium of claim 11 wherein the enciphered archive is the concatenation of H(P) XOR K and E(D,K) where H is a hash function, P is the passphrase, K is the key used to encipher the archive, E is an encryption function, D is an unenciphered data to be added to the archive.

14. The non-transitory computer readable storage medium of claim 11 wherein the enciphered archive is A, F(K,M(P, A)), E(D,K) where A is an archive key, F is an encryption algorithm, K is the key used to encipher the archive, M is a MAC function, P is the passphrase, E is an encryption function, D is an unenciphered data to be added to the archive.

* * * * *